United States Patent
Matsuzuka et al.

(10) Patent No.: US 9,141,867 B1
(45) Date of Patent: Sep. 22, 2015

(54) DETERMINING WORD SEGMENT BOUNDARIES

(71) Applicant: Amazon Technologies, Inc., Reno, NV (US)

(72) Inventors: Shinobu Matsuzuka, Cupertino, CA (US); Patrick J. Stammerjohn, Seattle, WA (US); Venkata Krishnan Ramamoorthy, Tamil Nadu (IN); Christopher A. Suver, Seattle, WA (US); Lokesh Joshi, Mercer Island, WA (US); Robert Wai-Chi Chu, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 13/707,338

(22) Filed: Dec. 6, 2012

(51) Int. Cl.
*G06K 9/34* (2006.01)

(52) U.S. Cl.
CPC .......................................... *G06K 9/34* (2013.01)

(58) Field of Classification Search
None
See application file for complete search history.

(56) References Cited

U.S. PATENT DOCUMENTS

| | | | | |
|---|---|---|---|---|
| 5,832,434 | A * | 11/1998 | Meredith | 704/260 |
| 5,862,259 | A * | 1/1999 | Bokser et al. | 382/228 |
| 6,292,176 | B1 * | 9/2001 | Reber et al. | 345/169 |
| 2010/0278453 | A1 * | 11/2010 | King | 382/321 |
| 2011/0282860 | A1 * | 11/2011 | Baarman et al. | 707/709 |
| 2012/0079372 | A1 * | 3/2012 | Kandekar et al. | 715/256 |
| 2014/0115436 | A1 * | 4/2014 | Beaver et al. | 715/229 |

* cited by examiner

*Primary Examiner* — Phuoc Tran
(74) *Attorney, Agent, or Firm* — Lee & Hayes, PLLC

(57) ABSTRACT

Some examples include segmenting text of a content item to include a plurality of segments or words. For instance, a module for segmenting a content item using a context-based segmenter into a plurality of segments, identifying segment boundary hints stored in the content item, and adjusting segments of the plurality of segments based on the identified segment boundary hints. Some additional examples include inserting segment boundary hints into a content item. For instance a module that segments the content item using a first segmenter and a second segmenter and inserting segment boundary hints into the content item where the results of the first and second segmenter differ.

30 Claims, 9 Drawing Sheets

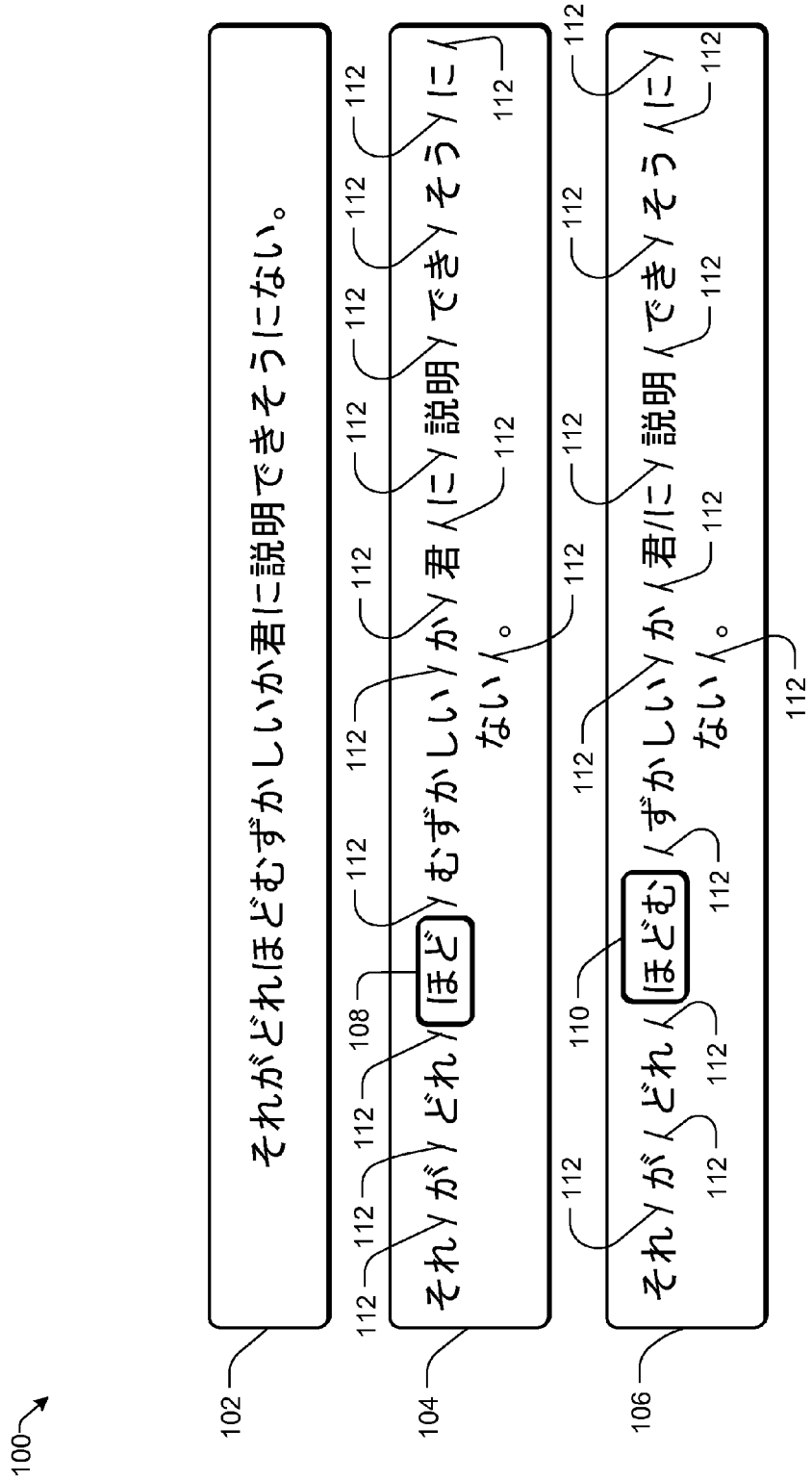

200

204

A Tale of Two Cities     

face habitually suppressed and quieted, was still lighted up under the quaint wig by a pair of moist bright eyes that it must have cost their owner, in years gone by, some pains to drill to the composed and reserved expression of Tellson's Bank. He had a healthy colour in his cheeks, and his face

202

214

212 lor·ry /lôrē; lärē/ *n.* (*pl.* -ries) BRIT. a large, heavy motor vehicle for transporting goods or troops; a truck.
<ORIGIN> mid 19$^{th}$ cent.: perhaps from the given name *Laurie*.

Full Definition ▶

216   218   220

Highlight | Add Note | Copy | More ▼

222 completing his resemblance to a man who was sitting for his portrait, Mr. Lorry dropped off to sleep. The arrival of his breakfast roused him, and he said to the drawer, as he moved his chair to it:

210

208

"I wish accommodation prepared for a young lady who may come here at any hour to-day.

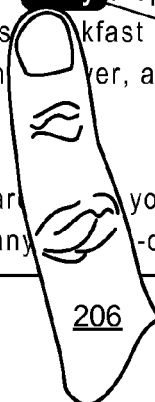

```
┌─────────────────────────────────────────────────────────────┐
│  RECEIVE A USER SELECTION AT A LOCATION WITHIN AT LEAST ONE │
│     SEGMENT OF A SEGMENTED PORTION OF A CONTENT ITEM        │
│                           902                                │
└─────────────────────────────────────────────────────────────┘
                              │
┌─────────────────────────────────────────────────────────────┐
│   SELECT OR HIGHLIGHT THE SEGMENT OF THE SEGMENTED PORTION  │
│     CORRESPONDING TO CHARACTERS SELECTED BY THE USER        │
│                           904                                │
└─────────────────────────────────────────────────────────────┘
                              │
┌─────────────────────────────────────────────────────────────┐
│   DISPLAY SUPPLEMENTAL INFORMATION RELATED TO THE SELECTED  │
│                         SEGMENT                              │
│                           906                                │
└─────────────────────────────────────────────────────────────┘
```

FIG. 9

DETERMINING WORD SEGMENT BOUNDARIES

BACKGROUND

The continued proliferation of digital content items has led to an increase in the availability of such content items, as well as an increase in the availability of electronic devices and applications used for providing these content items. For instance, users read text-based content items, such as electronic books (eBooks), magazines, newspapers, documents, or other textual content on an assortment of electronic devices.

Many of the electronic devices and applications for consuming the content items provide additional user selectable features and content not typically available in a print version. These features are frequently enabled in response to user selection of a portion of the text displayed on the electronic device. Often the electronic device is equipped with applications for consuming the content items, as well as, applications for assisting the user in selecting whole words or sentences. However, automated text selection becomes difficult when text of a content item is in a language in which word or segment boundaries are not clear.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates example excerpts of text of a content item in which segment boundary hints aid in segmentation according to some implementations.

FIG. 2 illustrates an example electronic device displaying a content item and user selection related to the content item according to some implementations.

FIG. 9 is a flow diagram illustrating an example process for selecting segmented text according to some implementations.

DETAILED DESCRIPTION

Figure 3:
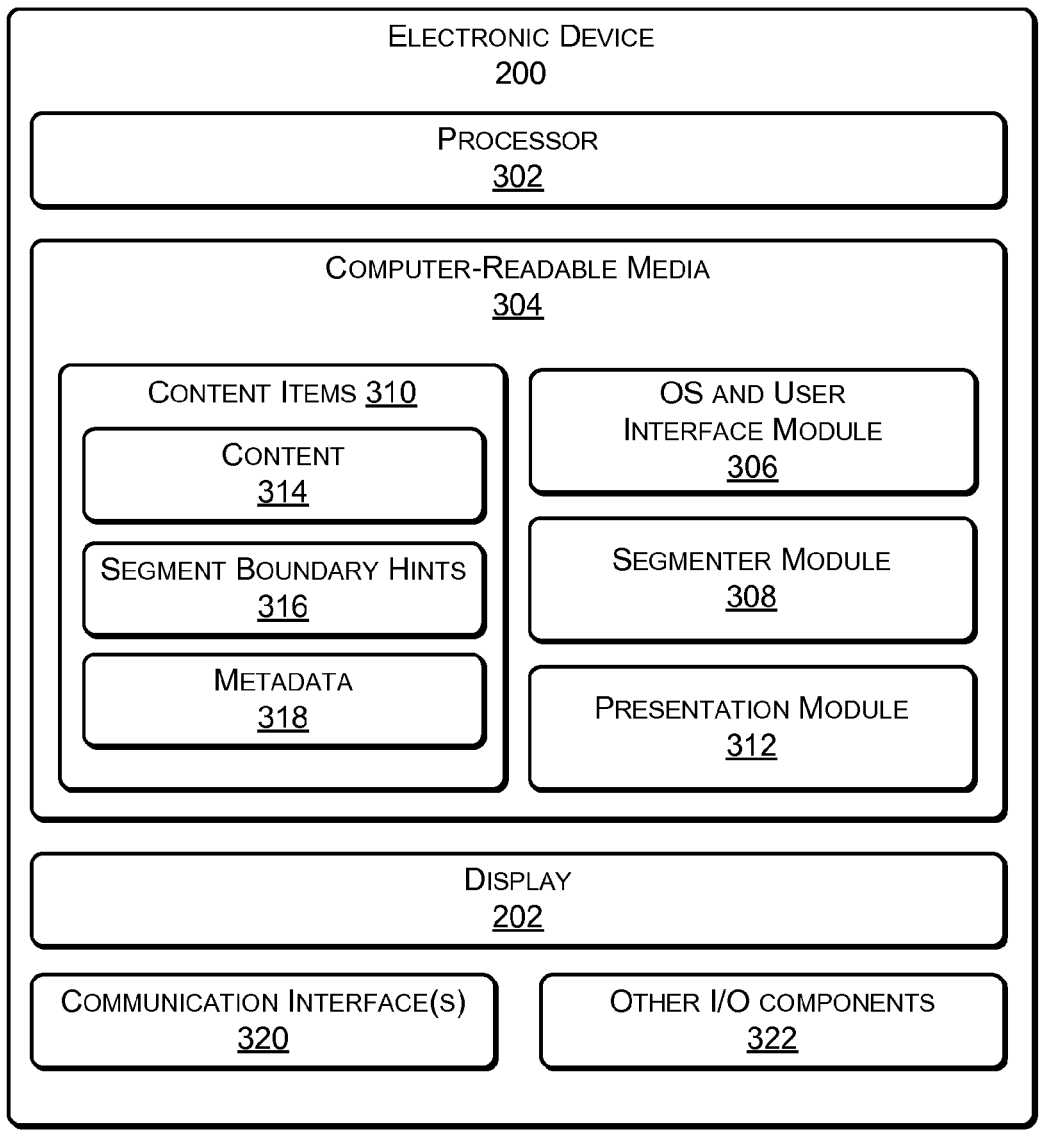
FIG. 3 illustrates select components of an example electronic device for displaying a segmented content item according to some implementations.

This disclosure includes techniques and implementations for providing segment boundary hints to a segmenter to parse text and determine word/segment boundaries of a content item. For example, an electronic device may utilize a segmenter on a content item in order to determine segment or word boundaries. The segments may then be adjusted according to segment boundary hints stored in the content item itself. In one particular example, the segment boundary hints are configured to aid the segmenter in adjusting the segments for situations in which the segmenter is known to produce faulty results.

Typically, two different types of segmenters are used in connection with segmenting a content item, namely, a context-based segmenter or a dictionary-based segmenter. Dictionary-based segmenters are relatively more accurate and deterministic, but are larger and more resource intensive than the context-based segmenters, causing the dictionary-based segmenters to be ineffective in certain computing environments, such for use on mobile electronic devices or other electronic devices having limited computing and memory resources.

Dictionary-based segmenters rely on the use of contour, skeleton and projection profile analysis to compare a word or character to words and characters stored in a dictionary. In some examples, the dictionary-based segmenters rely on comparison of the structural information of the words or characters to determine a closest base word or character and then apply a processor called lemmatization to determine differences in for example, tense and part of speech. Because dictionary-based segmenters rely on matching entries to a dictionary, the more complete the dictionary used by the segmenter, the better the results become. Accordingly, dictionary-based segmenters may include very large amounts of resources that require a large amount of storage or memory, such as large dictionaries, lists of names and named entities, lists of synonyms, and so forth that are accessed during segmentation.

Context-based segmenters are smaller, and better suited for use on some types of electronic devices, such as mobile devices, but typically operate in an accuracy range of 80-95 percent when determining segments on the device, such as on the fly. Context-based segmenters typically analyze the context associated with a text and select a word based on recognition using a set of rules or other evaluation functions, such as voting. In one example, the context-based segmenter generates multiple segmentation candidates and the most common occurring result is selected as the word. In another example, context-based segmenters may apply decision tree models, which apply syntactic attributes or syntax based rules to the text to identify the words based on the predefined tree structure. In other examples, the context-based segmenters rely on model training texts, pre-segmented text, or context templates and statistical machine learning methods to define context rules, which are applied systematically to content items. Consequently, as compared to dictionary-based segmenters, context-based segmenters may use substantially less computational resources, such as memory, storage, or processing resources, to segment a content item.

In one implementation, a content provider computing device applies two segmenters to a content item. The first segmenter is a resource intensive segmenter that is known to produce accurate segmentations. The second segmenter is typically less resource intensive and may be configured to operate on a user's electronic device. The content provider computing device inserts segment boundary hints into the content item according to locations in the text where the results of the first segmenter differ from the results of the second segmenter to aid a segmenter similar to the second segmenter operating on a user's electronic device to achieve greater accuracy when segmenting a content item. In one example, the two segmenters include a context-based segmenter configure to operate on a user's electronic device and a dictionary-based segmenter. In other examples, two dictionary-based segmenters may be used, such as a large dictionary-based segmenter using a complete dictionary and other resources, and a relatively smaller dictionary-based segmenter using a partial dictionary. Alternatively, in another example, two context-based segmenters may be used. In one particular example, additional segmenters may be used and the results compared to that of the first segmenter to support multiple different segmenters, which may operate on the user's electronic device.

In one example, the content provider computing device, such as a server system, applies a context-based segmenter and a dictionary-based segmenter to a content item and compares the results. The content provider computing device inserts segment boundary hints into the content item according to locations in the text where the results of the context-based segmenter differ from the results of the dictionary-based segmenter to aid a segmenter operating on a user's electronic device to achieve greater accuracy when segmenting a content item. In one particular example, segmenters aid computing devices in determining word/segment boundaries of text in complex languages. Segmenters are particularly useful in this example because word boundaries in complex languages, such as Japanese, Thai and Mongolian, are context-based and word delineators, such as spaces, are not used. Rather, the text flows as a single litany of characters and a reader is able to determine word boundaries according to the context.

In one implementation, a segmenter, such as a context-based segmenter, is configured to utilize segment boundary hints, which are included in one or more files of a content item, to improve the accuracy without significantly increasing file size of either the content item or the segmenter. In most cases, by utilizing segment boundary hints, the accuracy of the segmenter becomes comparable to that of a second segmenter used to generate the segment boundary hints.

FIG. 1 illustrates example excerpts 102, 104 and 106 of text of a content item 100 in a complex language in which segment boundary hints aid in segmentation according to some implementations. Excerpts 102, 104 and 106 include snippets of text in Japanese. In each excerpt 102, 104 and 106, the text is the same, however, excerpt 102 illustrates the text as it would appear to a Japanese reader without any word/segment delineators to illustrate the difficulties in parsing words in a complex languages.

Excerpts 104 and 106 illustrate the same text as 102 but include word delineators, as shown by the forward slashes 112. Forward slashes 112 illustrate the two different interpretations of word boundaries of the Japanese text in the present example; however, it should be understood, that forward slashes 112 are not present in actual Japanese documents. As can be seen from the illustration of FIG. 1, the segmentation of excerpt 104 differs from that of 106, such as at segments 108 and 110, respectively. At segment 108, a different word is formed in Japanese than the word formed at segment 110. A Japanese reader would be able to determine the word boundaries based on context; however, this can be a complicated process for an electronic device.

Excerpt 104 illustrates the text with correct word boundaries, as would be produced by a typical dictionary-based segmenter. Excerpt 106 illustrates word boundaries, as would be produced by a typical context-based segmenter. In some examples, the segmentation determined by the dictionary-based segmenter is assumed to be accurate. Thus, the segmentation of the excerpt 106 determined by the context-based segmenter is compared with the segmentation of the excerpt 104 determined by the dictionary-based segmenter to identify any differences in the segmentation results. To assist a context-based segmenter on a user's electronic device in producing the same segmentation results as in the excerpt 104, a content provider computing device may insert a segment boundary hint at segment 110, before providing the content item 100 to the user's electronic device.

For example, the context-based segmenter on a user's electronic device may be configured to segment a content item and, after the content item is segmented, to adjust the segmentation based on the segment boundary hints. In one example, the context-based segmenter may be configured to detect the segment boundary hints as the context-based segmenter scans the text to determine segment boundaries. The segment boundary hints may cause the context-based segmenter to adjust the interpretation of the context of the content item based on the segment boundary hints and, therefore, to adjust the segment boundary placement. In another example, the context-based segmenter may be configured to identify the segment boundary hints, and place segment boundaries accordingly, before analyzing the remaining content and completing the segmentation of the content item.

The segment boundary hints may include, for example, location information, such as the segment starting location, the segment ending location, a segment length and/or context clues. The segment boundary hints may be embedded into the text of a content item. In another example, the segment boundary hints may be included at the end of the content item or as metadata in the content item. In yet another example, the segment boundary hints may be included in another file, such as a metadata file associated the content item 100.

In one particular example, a process known as tokenization provides location information to form the segment boundary hints. Tokenization includes parsing the text of the content item 100 into tokens that may include individual words, punctuation marks, symbols, annotations, etc., contained in the text of the content item 100, and associating location information with each token identified in the content item 100. Thus, each word or punctuation mark in the text of the content item 100 may be assigned a unique location sequence or value, such as based on an offset of the token from the beginning of the digital work and a number of characters in the token, which may be referred to as the length of the token. Additionally, or alternatively, the location of a token within a digital work may be identified or specified using other location identification techniques. For instance, the location of each token may be identified according to the coordinates of a token on a page, such as x-y coordinates of each token on a page or within an image.

FIG. 1 illustrates example text in Japanese showing a complex language in which segment boundary hints are useful for aiding a context-based segmenter in generating a segmented content item. FIG. 2 provides an explanation of an example situation in which word segmentation of a content item increases usability of an electronic device. The example of FIG. 2 is shown in English to enable the example to be more easily explained, but in some implementations herein, the text may be in Japanese, Thai, Mongolian, or other language that employs a segmenter on the electronic device for identifying segments.

FIG. 2 illustrates an example electronic device 200 displaying a content item and user selection related the content item according to some implementations. Electronic device 200 may be implemented as any of a number of electronic devices, such as an eBook reader, a media player, a tablet computing device, a smart phone, a portable gaming device, a portable digital assistant, a laptop or netbook computer, and so forth. Furthermore, electronic device 200 may not necessarily be a mobile or portable device, and thus, in some implementations may include a desktop computer or other computing device, a gaming system, a television, other home electronics devices, automotive electronic devices, and so forth.

Electronic device 200 includes a display 202 for displaying content item 204 or other image or interface to a user. In some examples, display 202 may be a touch screen type of display configured with a sensor to sense a touch input received from an input effecter 206, such as a finger of a user, a stylus, or other pointer. Thus, the touch screen may receive one or more touch inputs, interactions, selections of displayed objects, page swipes and so forth.

In other examples, display 202 may be non-touch sensitive. Accordingly, in addition to, or as an alternative to, a touch sensitive display, electronic device 200 may include various external controls and input devices (not shown in FIG. 2). For example, some implementations of electronic device 200 may include a virtual or physical keyboard, a mouse, a pointing stick, a touchpad, a trackball, a joystick, a remote control, buttons and/or various other controls for performing various desired inputs and interactions with electronic device 200 and content item 204 displayed on display 202. Additionally, in some implementations, one or more voice commands may be used to control or interact with the digital works and interfaces herein, such as for selection of text and performing other functions. Thus, implementations herein are not limited to any type of input devices, techniques, or controls.

In some implementations, content item 204 may be an electronic book (eBook) having one or more pages of text, images, and so forth. For example, the display 202 may depict the text of the eBook and any illustrations, tables, maps, or graphic elements that might be contained in the eBook.

As used herein, the terms "book" and/or "eBook," includes electronic or digital representations of printed works, as well as digital content that may include text, multimedia, hypertext, and/or hypermedia. Examples of printed and/or digital works include, but are not limited to, books, magazines, newspapers, periodicals, journals, reference materials, textbooks, anthologies, instruction manuals, proceedings of meetings, forms, directories, web pages, plays, screen plays, closed captioning transcripts of movies and television shows, song lyrics, and so forth. Accordingly, the terms "book" and/or "eBook" may include any readable or viewable textual content that is in electronic or digital form. Additionally, some implementations herein are not limited to digital text, but may also include other digital works, such as digital audio (e.g., music, audible books, etc.), digital video (e.g., movies, television, short clips, etc.), images (e.g., art, photographs, etc.), and multi-media content, as described additionally below.

In the illustrated example, suppose that content item 204 is *A Tale of Two Cities* by Charles Dickens, and that a portion 208, such as a page, of content item 204 is currently displayed on display 202 of the electronic device 200. Furthermore, suppose that the user desires to obtain more information regarding a character, Mr. Jarvis Lorry.

In one implementation, electronic device 200 includes a segmenter (not shown in FIG. 2) and content item 204 includes segment boundary hints. In some examples, the segmenter may be a context-based segmenter, while in other examples, the segmenter may be a less resource intensive dictionary-based segmenter. In either event, the segmenter used on the electronic device 200 may use less memory or other computational resources than the segmenter used to determine the segment boundary hints. Before portion 208 is displayed on display 202, electronic device 200 analyzes portion 208 using the segmenter. As a result, the segmenter divides each word/segment of portion 208 into a segment. The segmenter adjusts the segments based on the segment boundary hints included in content item 204. The segmenter may adjust the segments before, during or after analyzing portion 208. As one example, the segmenter may access hint information included in a file In an example, as illustrated content item 204 includes the text "Tellson's Bank" 214 and the segmenter may have added segment delineators such that the text is broken into three word segments: "Tell," "son's" and "Bank." However, content item 204 is preconfigured to include segment boundary hints corresponding to each point in content item 204 in which the segmenter is known to produce a possibly incorrect segment. In this instance, the segmenter is able to identify the segment boundary hint and to adjust the segment boundaries, such that the text 214 is segmented into two words "Tellson's" and "Bank."

Portion 208 may be segmented before being displayed or while being displayed on display 202. As illustrated, the user may select an instance of the name Mr. "Lorry" currently displayed on electronic device 200 as segment 210 to display supplemental information 212, such as information about the selected text and a menu of options. For example, the display 202 may be a touch screen and the user may use input effecter 206 (e.g., the finger) to select the last name of Mr. Lorry as segment 210.

In response to receiving the user selection, segment 210 may be highlighted or otherwise visually distinguished to indicate that segment 210 is currently selected. In some examples, the segments are used to aid the user in the selection, and to indicate one or more selected segments. For example, as illustrated the user is selecting the text "Lorry" using input effecter 206 (e.g., the finger). The user may select the text for various reasons, for example, for obtaining a definition, adding a highlight to the text as indicated at 216, adding a note in association with the selected text, as indicated at 218, copying the selected text, as indicated at 220, such as to a clipboard, or for performing other available functions, as indicated at 222. Accordingly, the electronic device 200 may be configured to utilize segments to define a start point and an endpoint of a selectable portion of text. Thus, in response to a user selection of any portion of a segment, electronic device 200 may highlight or otherwise select the entire segment. For instance, if the "L" was selected electronic device 200 is able to highlight the entire word "Lorry" as the text "Lorry" represents a single segment of portion 208.

When segment 210 is selected, supplemental information 212 can be displayed on display 202 to provide additional information and/or metadata about the selected segment 210, in this example dictionary information relating to the word "Lorry." In some instances, the user is able to interact with supplemental information 212 using input effecter 206 to add a highlight to the text, add a note, copy the text, and/or view more information about the selected text, as discussed above.

It should be understood that the segments are not limited to words or phrases, but may include symbols, icons, images, figures, selectable areas of an image or video, and so forth. Similarly, textual content items may include symbols, maps, tables, images, and the like, that may also be segments that are selectable for viewing supplemental information 212 according to some implementations herein.

FIG. 2 provides one example of an electronic device in which segmented content items are useful. FIG. 3 provides an example of select components of an example electronic device, such as electronic device 200 of FIG. 2.

FIG. 3 illustrates select components of an example electronic device 200 for displaying a segmented content item according to some implementations. In one configuration, electronic device 200 includes, or accesses, components such as at least one control logic circuit, central processing unit, or processor 302 and one or more computer-readable media 304. Each processor 302 may itself comprise one or more processors or processing cores. Depending on the configuration of electronic device 200, computer-readable media 304 may be an example of tangible non-transitory computer storage media and may include volatile and nonvolatile memory and/or removable and non-removable media implemented in any type of technology for storage of information such as computer-readable instructions, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by processor 302 directly or through another computing device. Accordingly, computer-readable media 304 may be computer-readable media able to store and maintain instructions, modules or components executable by processor 302.

Computer-readable media 304 may be used to store any number of functional components that are executable by processor 302. In some implementations, these functional components comprise instructions or programs that are executable by processor 302 and that, when executed; implement operational logic for performing the actions attributed above to electronic device 200. Functional components of electronic device 200 stored in computer-readable media 304 may include an operating system (OS) and user interface module 306 and a segmenter module 308, a presentation module 312 at least one of which may be executed by processor 302 for displaying one or more content items 310 on a display. Additionally, the OS and user interface module 306 controls various functions of electronic device 200. Depending on the type of electronic device 200, the computer-readable media 304 may also optionally include other functional components, such as other modules, which may include applications, programs, drivers and so forth.

Computer-readable media 304 may also store data, data structures, and the like that are used by the functional components. For example, data stored by computer-readable media 304 may include one or more content items 310. Each content item 310 may include content 314 such as text, images, audio, video, or the like, segment boundary hints 316, to aid the user in selecting segments of text, and metadata 318. Metadata 318 is associated with content 318 of content item 310. For example, a content provider, an author, a publisher, etc., may provide or may generate at least a portion of metadata 318 for a corresponding content item 310. In one particular example, metadata 318 may include additional information, which the user can access by selecting text of content item 310 as described with respect to supplemental information 212 of FIG. 2. In addition, in some cases, the metadata 318 may include annotations of a user or other information related to user interaction with a content item, such as one or more segment boundary hints 316.

Electronic device 310 may also include other data, which may include, for example, data used by the OS and user interface module 306, the presentation module 312, and/or the other modules. Further, electronic device 200 may include many other logical, programmatic and physical components, of which those described are merely examples that are related to the discussion herein.

Electronic device 200 further includes display 202, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, display 202 may be an active display such as a liquid crystal display, plasma display, light emitting diode display, organic light emitting diode display, and so forth. These displays may comprise drive electronics, such as a display drive matrix configured to affect individual pixels within display 202. Additionally, in some implementations, display 202 may be a 3D display capable of providing a 3D image. For example, display 202 may produce a 3D image by providing alternating left-eye and right-eye images with or without the use of shuttering or filtering eyeglasses. Accordingly, in some implementations, the content items and user interface components herein may be rendered in 3D.

One or more communication interfaces 320 may support both wired and wireless connection to various networks, such as cellular networks, radio, WiFi networks, short-range or near-field networks (e.g., Bluetooth®), infrared signals, local area networks, wide area networks, the Internet, and so forth. For example, communication interface 320 may allow a user of electronic device 200 to access the World Wide Web, download content items from the content provider computer device, access online content, such as from a website or other network location, and the like. Communication interface 320 may further allow a user to access storage on another device, such as a user's computing device, a network attached storage device, cloud storage, or the like.

Electronic device 200 may further be equipped with various other input/output (I/O) components 322. Such I/O components may include a touchscreen and various user controls (e.g., buttons, a joystick, a keyboard, a mouse, etc.), speakers, a microphone, a camera, connection ports, and so forth. For example, the operating system of electronic device 200 may include suitable drivers configured to accept input from a keypad, keyboard, or other user controls and devices included as the I/O components 322. For instance, the user controls may include page turning buttons, navigational keys, a power on/off button, selection keys, and so on. Additionally, electronic device 200 may include various other components that are not shown, examples of which include removable storage, a power source, such as a battery and power control unit, a global positioning system (GPS) device, a PC Card component, and so forth.

In one implementation, a user selects one of content items 310 for display on display 202 using OS and user interface module 306 and presentation module 312. The selected content item is paginated into a number of portions based on the size of display 202 by presentation module 312, such that each portion may be displayed on display 202 as a single page. Before a portion is displayed, segmenter module 308 segments the portion into a number of user selectable segments. As discussed above the segments may be words, phrases, symbols, icons, images, or figures. The segments are formed by segmenter module 308. However, some of the segments may be of incorrect length due to errors, for example errors in context interpretation. The incorrect segments are adjusted using segment boundary hints 316 stored in the content item itself and the segmented portion is displayed on display 202. In some implementations, segmenter module 308 may be combined with presentation module 312 to form a combined presentation module, which paginates and segments content item 310.

Each content item includes one or more segment boundary hints 316 stored with the content item and may include segment start location, segment end locations, segment lengths, segment boundary definition, and/or context clues. In one particular example, the segment boundary hints 316 include delineations of word boundaries. Segment boundary hints 316 are added to a content item before the content item is downloaded to electronic device 200.

At a content provider computing device, each content item is analyzed using a first accurate segmenter and a second segmenter configured for use on an electronic device. For example, the first segmenter may be a dictionary-based segmenter with a large corpus and the second segmenter may be a context-based segmenter applying general syntax rules. In the example, the results are compared and segment boundary hints 316 are inserted into or stored with the content item where the results of the context-based segmenter differ from the results of the dictionary-based segmenter. Once the segment boundary hints 316 are inserted, the content item is made available for download, as will be discussed with more detail with respect to FIG. 4 below.

By utilizing a context-based segmenter and storing segment boundary hints 316 when differences between the results of the dictionary-based segmenter and the context-based segmenter occur, the accuracy of the dictionary-based segmenter can be achieved, without the space and processing requirements associate therewith. Additionally, because segment boundary hints 316 are only stored when the results differ, the file size of the content item is not significantly increased. Thus, the per-byte download fees, typically, paid by either the user or the content provider are keep within a reasonable range.

Figure 4:
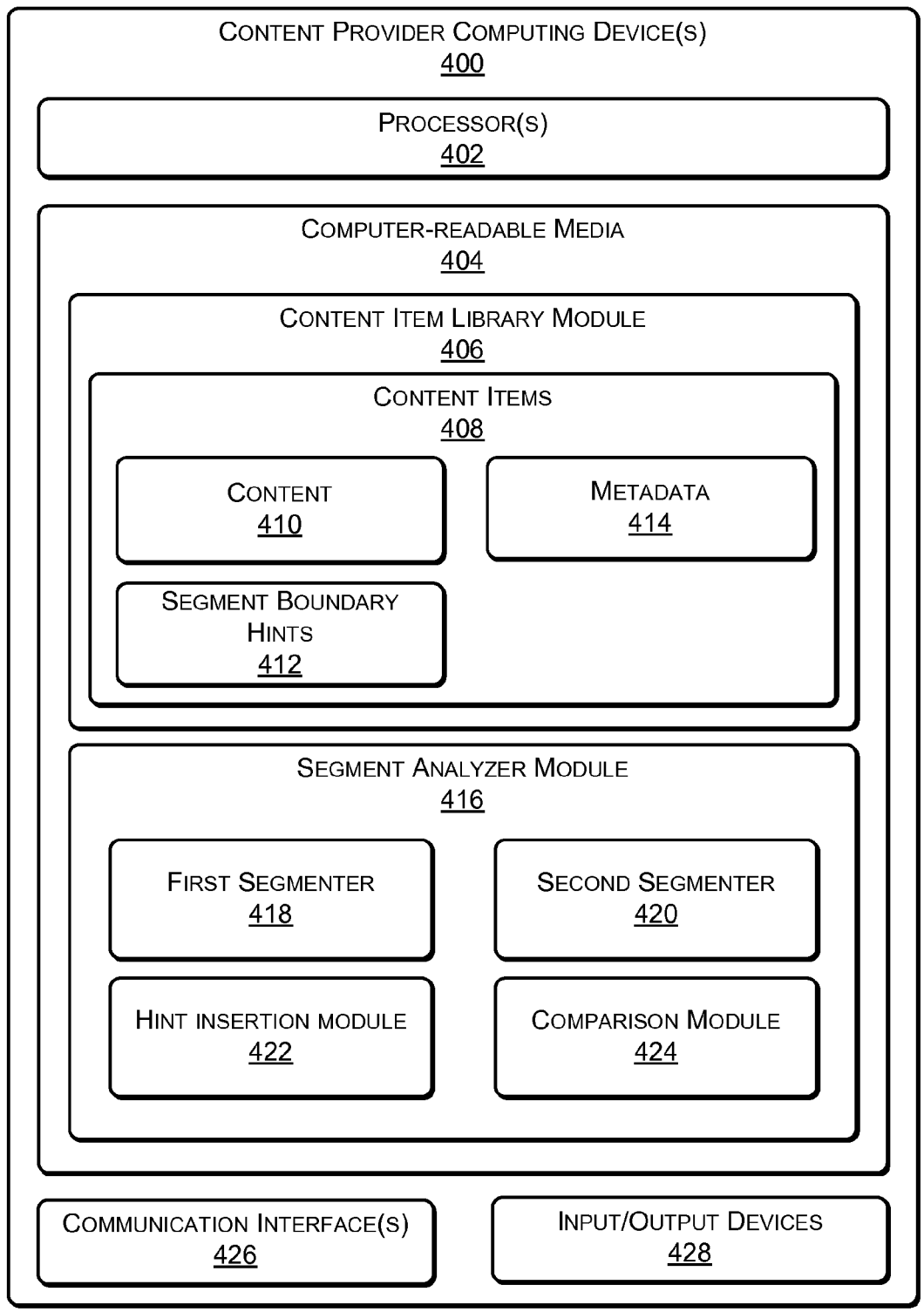
FIG. 4 illustrates select components of one or more example content provider computing device according to some implementations.

FIG. 4 illustrates select components of one or more example content provider computing devices 400 according to some implementations. Content provider computing device(s) 400 may be one or more servers or other types of computing devices that may be embodied in any number of ways. For instance, in the case of a server, content provider computing device(s) 400 may be a single server, a cluster of servers, a server farm or data center, a cloud hosted computing service, and so forth, although other computer architectures (e.g., a mainframe architecture) may also be used. Further, while the figures illustrate the components of a content provider computing device 400 as being present in a single location, it is to be appreciated that these components may be distributed across different computing devices and locations in any manner. Generally, content provider computing device 400 may be implemented with the various functionality described above distributed in various ways across the different computing devices. The computing devices may be located together or separately, and organized, for example, as virtual servers, server banks and/or server farms. The described functionality may be provided by the servers of a single entity or enterprise, or may be provided by the servers and/or services of multiple entities or enterprises.

Content provider computing device 400 includes one or more processors 402, one or more computer-readable media 404, and one or more communication interfaces 906. The processors 402 may be a single processing unit or a number of processing units, and may include single or multiple computing units or multiple processing cores. The processors 402 can be configured to fetch and execute computer-readable instructions stored in the computer-readable media 404 or other computer-readable media.

As discussed above with respect to computer-readable media 304, computer-readable media 404 may include volatile and nonvolatile memory and/or removable and non-removable media implemented in any type of technology for storage of information, such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store the desired information and that can be accessed by a computing device. Depending on the configuration of content provider computing device 400, the computer-readable media 404 may be a type of computer-readable storage media and may be a tangible non-transitory storage media.

Computer-readable media 404 may be used to store any number of functional components that are executable by processors 402. In many implementations, these functional components comprise instructions or programs that are executable by processors 402 and that, when executed, implement operational logic for performing the actions attributed above to the content provider computing device 400. Functional components of the content provider computing device 400 that may be executed on the processors 402 for implementing the various functions and features related to embedding hint boundaries and providing content items to electronic devices (such as electronic device 200) as described herein.

In addition, computer-readable media 404 may include, a content item library module 406, including one or more content items 408. Each content item 408 includes content 410 and segment boundary hints 412. For example, content 410 may be the text of *A Tale of Two Cities* by Charles Dickens and segment boundary hints 412 may include the word boundaries for the text "Tellson's Bank" as described with respect to FIG. 2. Each content item 412 may also include additional metadata 414, for example supplemental information, which may be displayed in response to a user selection. Content item library module 406 may further include library profiles and user information to aid in distributing content items 408 to one or more electronic devices associated with a user.

Computer-readable media 404 also includes segment analyzer module 416 for inserting segment boundary hints 412 into one or more of the content items 408. Segment analyzer module 416 generally includes a first segmenter 418, a second segmenter 420, a hint insertion module 422 and a comparison module 424. First segmenter 418 is typically a resource intensive but accurate segmenter, such as a dictionary-based segmenter with a complete dictionary. Second segmenter 420 may be a dictionary-based segmenter with a smaller dictionary or a context-based segmenter. In some examples, computer-readable media 404 may include a plurality of dictionary-based segmenters and/or context-based segmenters to generate various content items 408 for various languages and/or syntaxes. In one particular embodiment, segment analyzer module 416 may include a plurality of second segmenters corresponding to various segmenters that are available to users of electronic devices.

Content provider computing device 400 also includes one or more communication interface(s) 426 for sending and receiving content items 408. Communication interfaces 426 may include one or more interfaces and hardware components for enabling communication with various other devices, such as the electronic device 200, over one or more network(s). For example, communication interface(s) 426 may facilitate communication through one or more of the Internet, cable networks, cellular networks, wireless networks (e.g., Wi-Fi, cellular) and wired networks. Various different approaches to implementations described herein can be implemented in various environments. For instance, a network may include any suitable network, including an intranet, the Internet, a cellular network, a LAN, WAN, VPN or any other network or combination thereof. Components used for such a system can depend at least in part upon the type of network and/or environment selected. Protocols and components for communicating via such networks are well known and are not discussed herein in detail.

Content provider computing device 400 may further be equipped with various input/output devices 428. Such I/O devices 428 may include a display, various user interface controls (e.g., buttons, mouse, keyboard, touch screen, etc.), audio speakers, connection ports and so forth.

Generally, content provider computing device 400 receives a content item 408 from a content source via one or more communication interfaces 426. Under the control of processors 402, content provider computing device 400 stores content item 408 in content item library module 406 and makes the content item 408 available for download to or access by electronic device(s) 200. Processors 402 also execute segment analyzer module 416 with respect to content item 408. Segment analyzer module 416 applies both first segmenter 418 and second segmenter 420 to content item 408 and both segmenters 418 and 420 produce a segmented content item as a result.

Comparison module 424 takes the results of both segmenters 418 and 420 and compares them to determine the location within content 410 of content item 408 in which the results differ. If comparison module 424 detects a difference between the results hint insertion module 422 inserts a segment boundary hint into content item 408. For example, hint insertion module 422 may be configured to insert the segment boundary hint into the text of content item 408 at the location of discrepancy or into information included in a file of content item 408. Hint insertion module 422 may also be configured to generate metadata or hidden text corresponding to the inserted segment boundary hint.

Figure 5:
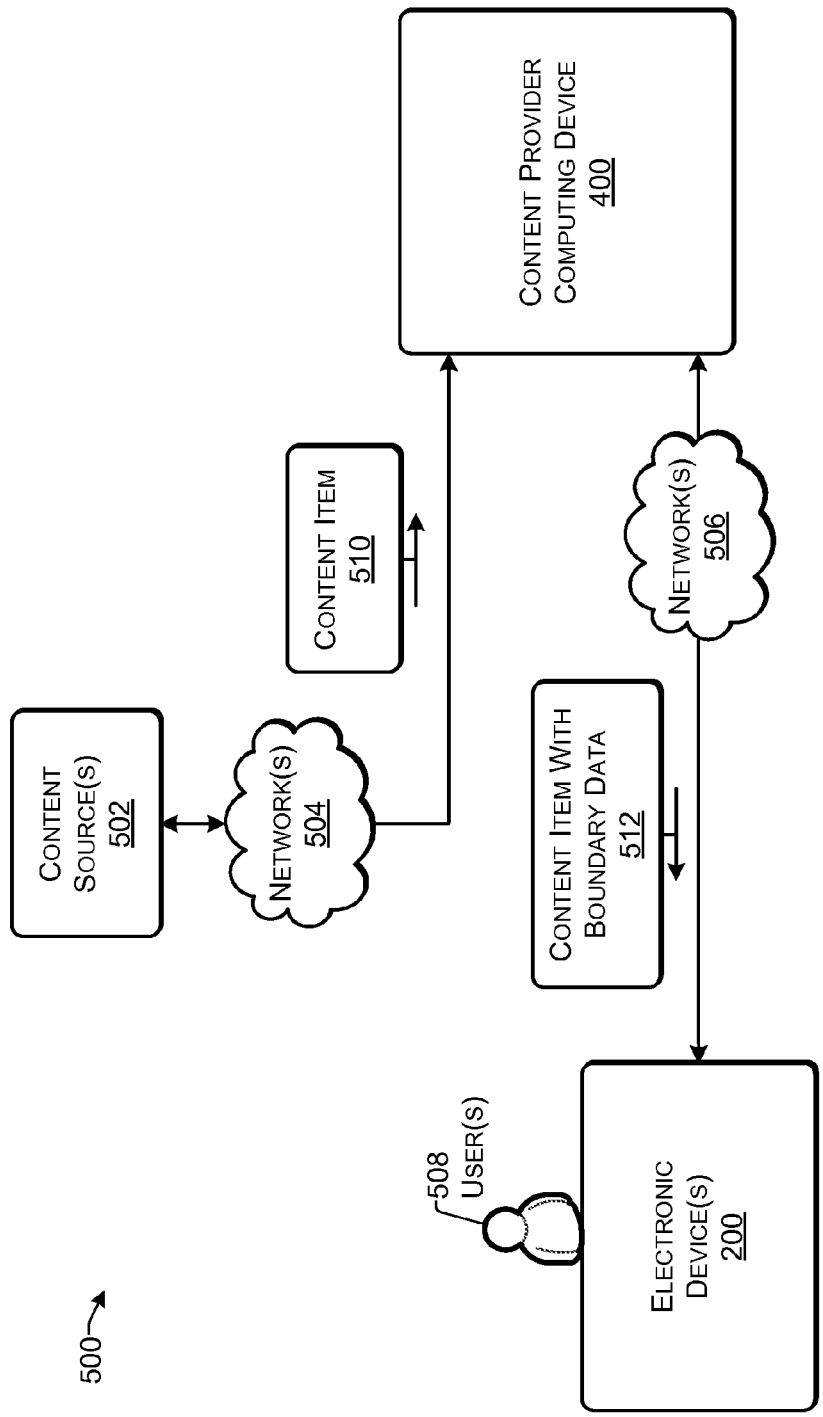
FIG. 5 illustrates an example system architecture for providing a content item with segment boundary hints to an electronic device according to some implementations.

FIG. 5 illustrates an example system architecture 500 for providing a content item with segment boundary hints to an electronic device 200 according to some implementations. System architecture 500 includes one or more content sources 502 and one or more electronic devices 200 in communication with a content provider computing device 400 via one or more networks, such as networks 504 and 506. In one example, content item 510 is provided by content source 502 and accessed as content item 512 by one or more electronic devices 200 capable of displaying, rendering or otherwise presenting content items on a display.

In some examples, electronic devices 200 may be digital media devices and eBook readers, tablet computing devices, desktop, terminal and workstation computing devices, smart phones and mobile devices, laptop and netbook computing devices, televisions, gaming systems, and home and automotive electronic devices, and any other device capable of accessing and rendering or playing content items, online content, mobile content, textual content, multimedia content, or the like.

In the illustrated example, content provider computing device 400 may maintain an online location or site, such as a merchant website, an e-commerce site, or other functionality that offers one or more content items to the public. For example, the content provider site may be hosted on one or more of computing devices. In some cases, the host computing devices may be one or more web servers located at a data center, server farm, or other single physical location. In other cases, the content provider site or portions thereof may be located in diverse locations that are physically remote from one another. Further, in some implementations, the content provider site may be a group of websites, data stores, services, and the like, hosted on a plurality of different host computing devices in a plurality of diverse locations, or hosted by one or more host computing devices at a single location.

In some examples, content provider computing device 400 alternatively, or additionally, may provide content items through an online or mobile application executing on electronic device 200. For instance, an application on electronic device 200 may connect to or obtain content from the content provider computing device 400 to enable the purchase or management of one or more content items, and the like. Thus, the content provider computing device 400 may enable electronic device 200 to access content items through an online or mobile application executing on a mobile electronic device 200, such as an eBook reader, smart phone, tablet computing device, augmented reality device, or the like. Accordingly, the content provider computing device 400 is not limited to a website accessed by a browser, but may encompass other technologies for marketing and providing content items 106, such as through in-application shopping, and the like.

In some examples, content sources 502 may be one or more of a publisher, author, movie distributer, studio, music company, artist, or so forth. For example, content source 502 may provide content items, such as content item 510, in various digital display formats, device platforms, and so forth. In a particular example, a content source and content provider may be the same entity. For instance, content source may be a publisher, which maintains a commercial website to allow users 508 to download digital content items.

In some examples, content provider computing device 400 communicates with one or content sources 502 and electronic devices 200 via one or more network(s) 504 and 506. Networks 504 and 506 may include a local area network (LAN), a wide area network (WAN), such as the Internet, or any combination thereof, and may include both wired and wireless communication technologies using any suitable protocols and communication techniques. For example, content provider computing device 400 may communicate and interact with one or more electronic devices 200 and content sources 502 using any combination of suitable communication and networking protocols, such as Internet protocol (IP), transmission control protocol (TCP), hypertext transfer protocol (HTTP), and so forth.

In one example, content source 502 distributes content item 510, such as an electronic book or publication, to content provider computing device 400. Content provider computing device 400 applies a first accurate but resource intensive segmenter and a second segmenter configured to operate on one or more electronic devices 200 to content item 510 and compares the results. At each location where the results of the first segmenter differs from the results of the second segmenter, content provider computing device 400 generates a segment boundary hint to generate content item 512 including segment boundary data, such as hint data. Content item 512 with boundary data is stored in content item library and made available for download.

Content provider computing device 400 receives a download request from one or more electronic devices 200 for content item 510. Content provider computing device 400 provides content item 512 with segment boundary data to the requesting electronic devices in response. Electronic device 200 segments content item 512 utilizing a segmenter similar to the second segmenter but also configured to adjust segments using the segment boundary hint data. For example, by reading the segment boundary hint data while analyzing content item 512 to aid in determining context before placing the segment boundary delineators.

FIGS. 6-9 are flow diagrams illustrating an example processes to detect errors in recognized text according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 6:
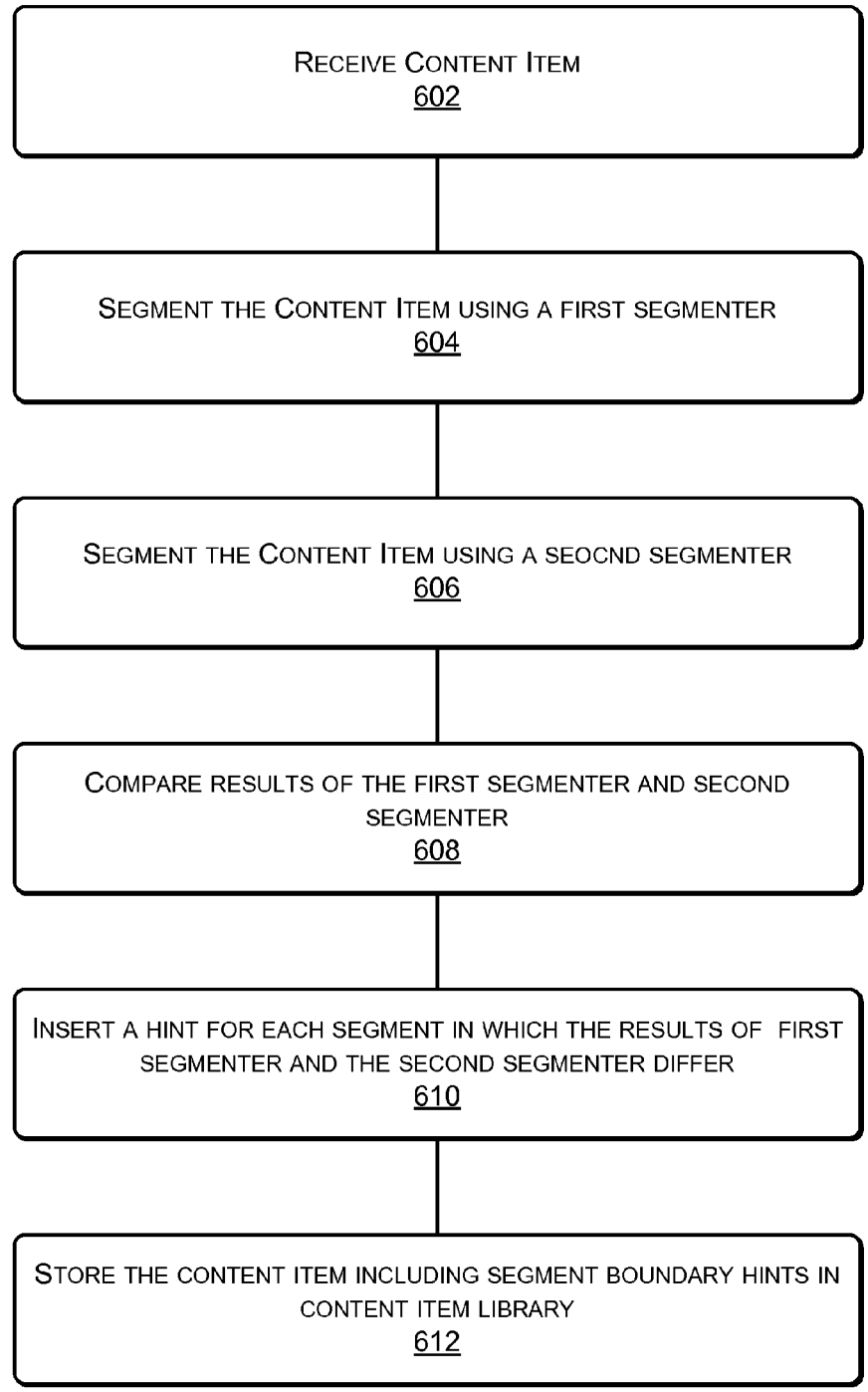
FIG. 6 is a flow diagram illustrating an example process to add segment boundary hints in a content item according to some implementations.

The process of FIG. 6 is just one possible example of a technique for inserting segment boundary hints into a content item. Accordingly, implementations herein are not limited to the specific examples shown and described. In some examples, the process 600 of FIG. 6 may be executed by one or more computing devices, such as one or more computing devices of a content item provider, or other entity, executing the modules discussed above, or other suitable computer code.

At 602, a computing device, such as content provider computing device 400, receives a content item from a content source, such as content source 502.

At 604, the computing device segments the content item using a first segmenter. The first segmenter may be any segmenter known to produce an accurate segmentation. For example, the first segmenter may be a dictionary-based segmenter with a complete dictionary. However while, dictionary-based segmenters are typically very accurate they are large programs and data and can require long processing time and memory. Thus, the dictionary-based segmenters are not suitable for many of the portable electronic devices, such as many eBook readers that have limited space and processing power. However, because size and processing requirements are not an issue for the content provider computing device, the content provider computing device may execute the dictionary-based segmenter on a content item and utilize the results as a guide to indicate a correct segmentation based on accurately placed word and segment boundaries.

At 606, the computing device segments the content item a second time using a second segmenter. The second segmenter may be a segmenter that is configured for operation on a portable electronic devices. For example, the second segmenter may be a context-based segmenter, which is typically much smaller, uses substantially less memory, and is less processing intensive than the typical dictionary-based segmenters and, thus, more suitable for use on the portable electronic devices.

At 606, the computing device compares results of the first segmenter and second segmenter. By comparing the results of the first segmenter and the second segmenter, the computing device is able to identify locations in the text of the content item where the second segmenter generated possibly faulty results.

At 606, the computing device inserts a hint for each segment/word in which the results of first segmenter and the second segmenter differ. For example, the computing device may insert the segment boundary hints into the text of the content item at the location of discrepancy or into a file appended to the end of the content item. In another example, the computing device may insert the segment boundary hints into the metadata associated with the content item.

At 606, the computing device stores the content item including segment boundary hints in content item library and makes the content item available for purchase and/or download to one or more electronic devices. The computing device may also make the second segmenter used to generate the segment boundary hints available for purchase and/or download with the content item, at least for those versions of the content item in a complex language.

Figure 7:
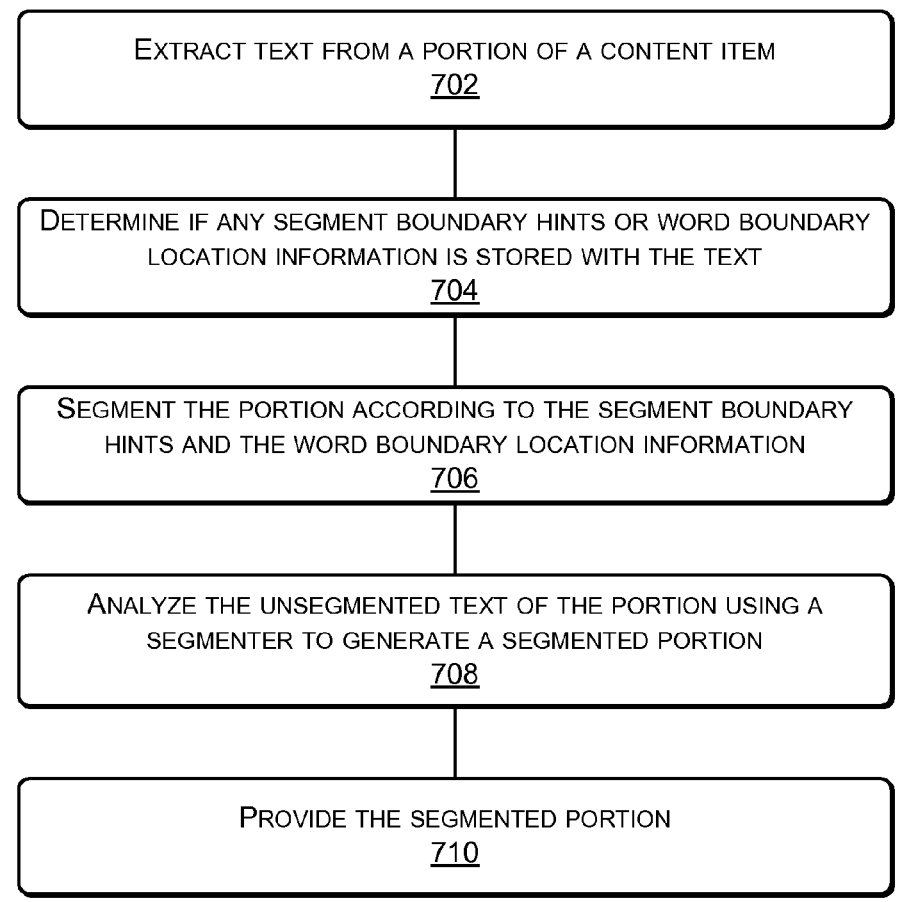
FIG. 7 is a flow diagram illustrating an example process for generating segmented text from a portion of a content item including segment boundary hints according to some implementations.
Figure 8:
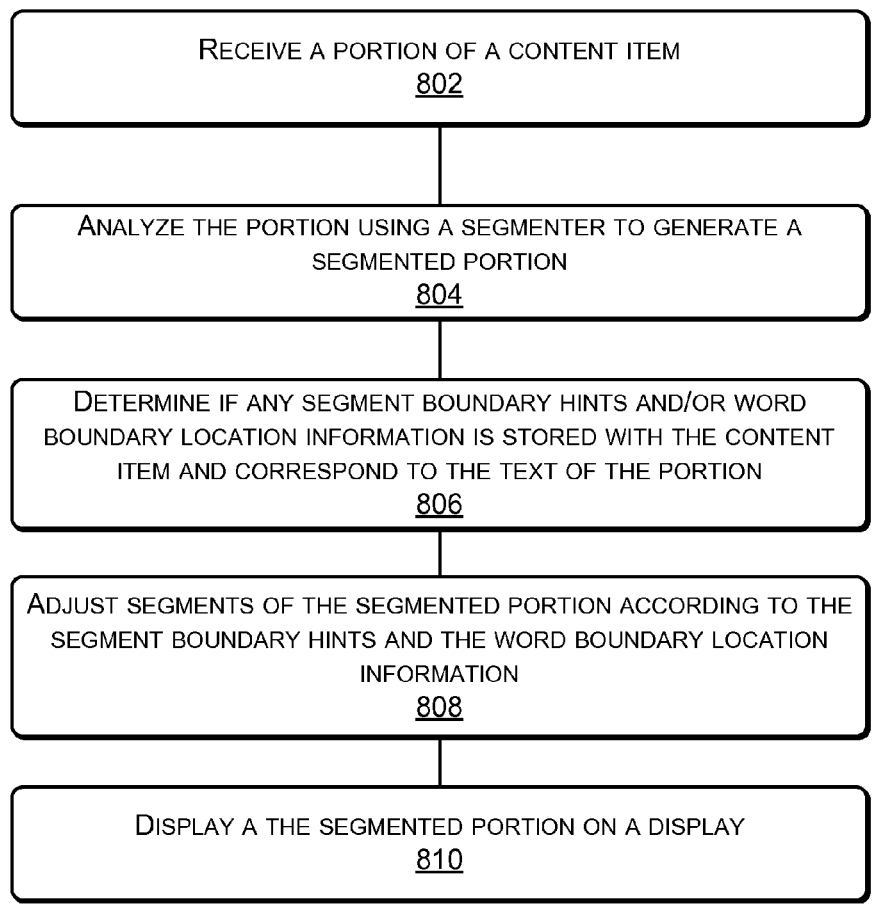
FIG. 8 is a flow diagram illustrating an example process for generating segmented text from a portion of a content item including segment boundary hints according to some implementations.

FIG. 6 illustrates an example process for inserting segment boundary hints into a content item. FIGS. 7 and 8 illustrate example processes for segmenting a content item at an electronic device using segment boundary hints.

The process of FIG. 7 is just one possible example of a technique for segmenting a content item using segment boundary hints. Accordingly, implementations herein are not limited to the specific examples shown and described. In some examples, the process 700 of FIG. 7 may be executed by one or more computing devices, such as one or more computing devices of a content item provider, or other entity, executing the modules discussed above, or other suitable computer code.

At 702, a segment analyzer module, such as segment analyzer module 416, of an electronic device, such as electronic device 200, extracts at least a portion of a content item selected by the user for display on a display. Depending on the size of the display, the extracted portion of the content item may vary in size.

At, 704, the segment analyzer module determines if any word boundary hints and/or word boundary location information is stored with the text. For example, the segment analyzer module may scan the text of the extracted portion for embedded segment boundary hints. In another example, the segment analyzer may read a file attached or provided with the content item to identify the segment boundary hints.

At 706, the segment analyzer module segments the portion according to the segment boundary hints and the word boundary location information. For example, the segment analyzer module may insert segment boundaries and/or divide the text of the portion into segments corresponding to segments indicated by the segment boundary hints and/or word boundary location information. In one example, the segment boundary hints may be absolute values indicating a start position and end position (or start position and length of a segment) for a given segment and segment analyzer module may generate a partially segmented portion corresponding to the segments indicated by the start and end positions. In one particular example, the segment boundary hints and/or word boundary location information may include context clues, which indicate to a context-based segmenter of the segment analyzer module the context of a given portion of text of and allow the context-based segmenter to accurately segment the content item.

At 708, the segment analyzer module analyzes the unsegmented text of the portion using a segmenter to generate a fully segmented portion. Before the content item is provided to the electronic device, the content item is analyzed by a content provider and/or content source and segment boundary hints are inserted into the content item to indicate locations in which the results of the segmenter used on the electronic may be faulty. Thus, segment boundary hints are only included with the content item for segments that the segmenter is known to produce possibly faulty results. Therefore, the segment analyzer is typically only able to partially segment the portion using the segment boundary hints and analyzes the remaining unsegmented text using the segmenter to insert the remaining segment boundaries.

At 710, the segment analyzer module provides the segmented portion, for example, to a display for presentation of the portion to the user. In another example, the segment analyzer module may provide the segmented portion to another module stored in computer-readable media of the electronic device for additional processing.

FIG. 8 is a flow diagram illustrating a second example process 800 for generating segmented text from a portion of a content item including segment boundary hints according to some implementations. At 802, a segment analyzer module, such as segment analyzer module 416, of an electronic device, such as electronic device 200, receives a portion of a content item selected by a user for display. The portion of content item may vary depending on make and model of the electronic device and/or on the size of the display.

At 804, the segment analyzer module analyzes the portion using a segmenter, such as a context-based segmenter, to generate a segmented portion. However, as discussed above, the segmented portion may include one or more incorrectly represented segments, for example due to errors in segmenting a content item using a context-based segmenter.

At 806, the segment analyzer module determines if any segment boundary hints and/or word boundary location information is stored with the content item and corresponds to the text of the portion. For example, the segment analyzer module may scan the text of the extracted portion for embedded segment boundary hints or word boundary location information. In another example, the segment analyzer may read a file or metadata attached to or provided with the content item to identify the segment boundary hints or word boundary location information.

At 808, the segment analyzer module adjusts segments of the segmented portion according to the segment boundary hints and the word boundary location information. For example, the segment analyzer may combine two or more segments into a single segment as illustrated with the text "Tellson's Bank" in the example of FIG. 2. In other examples, the segment analyzer may move the segment boundaries by one or more characters, as shown with the example expert text "ほどむ" of FIG. 1.

At 810, the segment analyzer module provides the segmented portion to a display to display the segmented portion to a user. In another example, the segment analyzer module may provide the segmented portion to another module stored in computer-readable media of the electronic device for additional processing.

FIG. 9 is a flow diagram illustrating an example process 900 for selecting segmented text according to some implementations. At 902, an electronic device, such as electronic device 200, receives a user selection at a location within at least one segment of a segmented portion of a content item. For example, the user may be attempting to select or highlight a word or phrase of the segmented portion on a touch sensitive display by touching one or more characters of the text currently displayed.

At 904, the electronic device receives a selection, for example the touch at the touch sensitive display, corresponding to one or more characters of a segment. The electronic device is able to select or highlight the segment of the segmented portion corresponding to characters selected by the user, as the segments were defined prior to displaying the portion on the display.

At 906, the electronic device, for example, displays supplemental information related to the selected segment on the display. In the example of FIG. 2, the electronic device provides a menu including supplemental information 212, such as dictionary information about a selected segment of text in response to a selection of the text "Lorry." In other examples, the electronic device may provide a link to a more compete dictionary definition or thesaurus for a selected word or phrase. In other examples, the electronic device may display a link to Google® or Yahoo® search engines, such that the user is able to easily perform a web-based search of the selected text (i.e., by selection of the "more" dropdown menu, as indicated at 222 in FIG. 2).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
   one or more processors;
   one or more computer-readable media; and
   one or more modules maintained on the one or more computer-readable media, which when executed by the one or more processors, cause the one or more processors to perform operations comprising:
      receiving a content item from a content source;
      segmenting the content item using a first segmenter to generate a first segmented content item;
      segmenting the content item using a second segmenter configured for use on a portable electronic device to generate a second segmented content item;
      comparing the first segmented content item to the second segmented content item to identify differences in segmentation of the first segmented content item and the second segmented content item;
      associating a segment boundary hint with the content item, wherein the segment boundary hint corresponds to an identified difference in the segmentation of the first segmented content item and the second segmented content item;
      receiving, from an electronic device, a request to access the content item; and
      sending, to the electronic device, the content item and the segment boundary hint in response to the request.

2. The system as recited in claim 1, wherein the operations further comprise determining that the first segmenter is a dictionary-based segmenter and that the second segmenter is a context-based segmenter.

3. The system as recited in claim 1, wherein the operations further comprise determining that the first segmenter and the second segmenter are dictionary-based segmenters, the first segmenter having a more complete dictionary than the second segmenter.

4. The system as recited in claim 1, wherein the operations further comprise determining that the first segmenter and the second segmenter are context-based segmenters, the first segmenter produces a more accurate segmented content item than the second segmenter.

5. The system as recited in claim 1, wherein the associating the segment boundary hint with the content item comprises inserting the segment boundary hint into a file including at least one of:
content of the content item; or
metadata associated with the content item.

6. The system as recited in claim 1, wherein the associating the segment boundary hint with the content item comprises embedding the segment boundary hint into text of the content item at a location at which the segmentation of the first segmented content item and the second segmented content item differ.

7. The system as recited in claim 1, wherein the operations further comprise determining that the segment boundary hint comprises location information including a starting character and a segment length.

8. A method comprising:
under control of one or more processors configured with executable instructions,
identifying a plurality of segments of content in a content item;
determining that a segment boundary hint is associated with the content item;
adjusting a segment of the plurality of segments based on the segment boundary hint; and
presenting the content of the content item based at least in part on the plurality of segments.

9. The method as recited in claim 8, further comprising:
determining that the segment boundary hint is associated with the content item; and
partially segmenting the content item based at least in part on the segment boundary hint before the identifying the plurality of segments.

10. The method as recited in claim 8, wherein the presenting comprises visually distinguishing one or more segments of the plurality of segments during the presenting.

11. The method as recited in claim 8, further comprising receiving a user selection of at least one segment of the plurality of segments.

12. The method as recited in claim 11, further comprising highlighting the at least one segment during the presenting.

13. The method as recited in claim 11, further comprising causing presentation of information related to the at least one segment on a display.

14. The method as recited in claim 8, further comprising determining that the segment boundary hint is a word boundary.

15. The method as recited in claim 8, further comprising determining that the content item is at least a portion of an electronic book.

16. The method as recited in claim 8, further comprising determining that the segment boundary hint comprises location information that identifies a location in the content of a particular segment of the plurality of segments.

17. The method as recited in claim 8, further comprising determining that the location information includes a starting character and an ending character.

18. One or more non-transitory computer-readable media maintaining instructions executable by one or more processors to perform operations comprising:
segmenting content of a content item using a first segmenter;
segmenting the content of the content item using a second segmenter;
comparing first results of the first segmenter and second results of the second segmenter; and
associating first location information with the content item corresponding to one or more segments of the content item where the first results of the first segmenter and the second results of the second segmenter differ.

19. The non-transitory computer-readable media as recited in claim 18, wherein the operations further comprise determining that the first location information corresponds to a boundary between two words in the content.

20. The non-transitory computer-readable media as recited in claim 18, wherein the operations further comprise determining that the first segmenter is a dictionary-based segmenter and that the second segmenter is a context-based segmenter.

21. The non-transitory computer-readable media as recited in claim 18, wherein the associating the first location information comprises adding the first location information to metadata associated with the content item.

22. The non-transitory computer-readable media as recited in claim 18, wherein the associating the first location information comprises including the first location information in a file including the content of the content item.

23. The non-transitory computer-readable media as recited in claim 18, wherein the operations further comprise:
segmenting the content of the content item using a third segmenter;
comparing the first results of the first segmenter and third results of the third segmenter; and
associating second location information with the content item corresponding to the one or more segments of the content item where the first results of the first segmenter and the third results of the third segmenter differ.

24. The non-transitory computer-readable media as recited in claim 18, wherein the operations further comprise determining that the first segmenter is more resource intensive than the second segmenter.

25. One or more non-transitory computer-readable media maintaining instructions that, when executed by one or more processors, cause the one or more processors to perform operations comprising:
receiving a content item having word boundary location information associated therewith;
executing a segmenter on the content item to identify a plurality of segments of content of the content item based at least in part on a context of the content item and at least in part on the word boundary location information; and
presenting the content of the content item on a display based at least in part on the plurality of segments.

26. The non-transitory computer-readable media as recited in claim 25, wherein the operations further comprise:
receiving a user selection corresponding to at least a portion of a segment of the plurality of segments; and
presenting information related to the at least the portion of the segment on the display based at least partly on the user selection.

27. The non-transitory computer-readable media as recited in claim 25, wherein the operations further comprise determining that the segmenter is a context-based segmenter.

28. The non-transitory computer-readable media as recited in claim 25, wherein the display is for an electronic book reader.

29. The non-transitory computer-readable media as recited in claim 25, wherein the operations further comprise determining that at least one segment of the plurality of segments corresponds to a word.

30. The non-transitory computer-readable media as recited in claim 25, wherein the operations further comprise determining that at least one segment of the plurality of segments corresponds to a phrase.

* * * * *